United States Patent [19]
Baker

[11] 3,723,626
[45] Mar. 27, 1973

[54] FUNGICIDAL AND BACTERICIDAL COMPOSITIONS AND METHOD OF KILLING BACTERIA AND FUNGI USING SUBSTITUTED BIS (BROMOACETOXY) XYLENES

[75] Inventor: Don R. Baker, Orinda, Calif.

[73] Assignee: Stauffer Chemical Company, New York, N.Y.

[22] Filed: May 15, 1972

[21] Appl. No.: 253,097

Related U.S. Application Data

[62] Division of Ser. No. 853,973, Aug., 1969, Pat. No. 3,681,439.

[52] U.S. Cl. .................................. 424/311, 424/304
[51] Int. Cl. ................................................ A01n 9/24
[58] Field of Search ...................................... 424/311

[56] References Cited

UNITED STATES PATENTS 3,006,967  10/1961  Newcomer et al. .................260/487
3,219,688  11/1965  Weil et al. ...........................260/487

FOREIGN PATENTS OR APPLICATIONS 566,283  11/1958  Canada ...............................260/487

Primary Examiner—Jerome D. Goldberg
Assistant Examiner—Allen J. Robinson
Attorney—Daniel C. Block et al.

[57]  ABSTRACT

Compounds having the formula

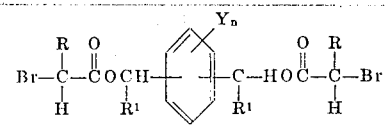

in which R is hydrogen or cyano and $R^1$ is hydrogen or methyl, Y is H, lower alkyl or halo, $n$ is a whole integer of from 1 to 4, and the use of these compounds as biocides such as in controlling fungi and bacteria.

9 Claims, No Drawings

FUNGICIDAL AND BACTERICIDAL COMPOSITIONS AND METHOD OF KILLING BACTERIA AND FUNGI USING SUBSTITUTED BIS (BROMOACETOXY) XYLENES

SUMMARY OF THE INVENTION

This is a division of application Ser. No. 853,973 filed Aug. 28, 1969, now U.S. Pat. No. 3,681,439, issued Aug. 1, 1972.

This invention comprises novel compositions of matter and their use as biocides. More particularly, the invention relates to compositions of matter having the formula

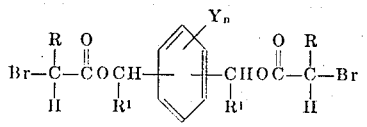

wherein R is selected from the group consisting of hydrogen and cyano; R¹ is selected from the group consisting of hydrogen and methyl; Y is selected from the group consisting of hydrogen, lower alkyl, and halo, n is a whole number from 1 to 4, and the use of these compositions as fungicides and bactericides.

DESCRIPTION OF PREFERRED EMBODIMENT

In its most preferred form, this invention relates to compositions of matter having the formula

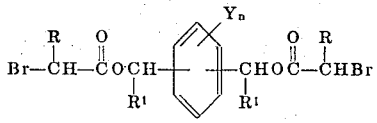

wherein R is selected from the group consisting of hydrogen and cyano and R¹ is selected from the group consisting of hydrogen and methyl, Y is selected from the group consisting of hydrogen, methyl, ethyl, chloro and bromo, n is a whole number from 1 to 3, and the use of these compositions as fungicides and bactericides.

Representative compounds of this invention are as follows:

α,α'-bis(bromoacetoxy)-o-xylene
α,α'-bis(bromoacetoxy)-m-xylene
α,α'-bis(bromoacetoxy(-p-xylene
α,α'-bis(bromoacetoxy)-2-chloro-p-xylene
α,α'-bis(bromoacetoxy)-2,3,5-tribromo-p-xylene
α,α'-bis(bromocyanoacetoxy)-2-chloro-p-xylene
α,α'-bis(bromoacetoxy)-2-methyl-p-xylene The compounds of the present invention are particularly useful in inhibiting the growth of bacteria and fungi.

The compounds may be prepared by reacting a compound of the formula

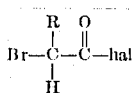

(reactant A) with a compound (reactant B) having the formula

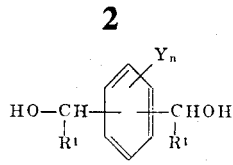

wherein R¹ is selected from the group consisting of hydrogen and methyl, Y is selected from the group consisting of hydrogen, lower alkyl, and halo, and n is a whole number from 1 to 4.

The concentrations employed are not particularly critical, although generally a slight excess of the acetyl halide (reactant A) will be employed. A suitable concentration will thus be from about 2.0 mols to about 2.7 mols of the acetyl halide (reactant A) per mole of diol (reactant B), although additional quantities of reactant A may be present. The preferred range of concentration will be from about 2.0 mols to about 2.3 mols of (reactant A) per mol of (reactant B).

The reactions are preferably carried out under anhydrous conditions in the presence of a base such as pyridine or triethylamine and in a solvent for the reactants. Suitable solvents include ether, benzene, chloroform or tetrahydrofuran. Reactions of this type are normally exothermic so that the addition of heat is not required. In actuality, cooling may sometimes be required to control the reaction temperature. The reaction will normally be carried out at a temperature of from about 0°C. to about 50°C.

While generally it is preferred that each R group be identical in the compounds of the invention, it is not a requirement, and compounds wherein the reacted acyl moieties contain differing acyl moieties are contemplated. Similarly, it is not necessary that each R¹ group be identical in the hydroxy containing aromatic precursor. These may be synthesized in the case of differing R groups by "masking" one hydroxyl group on the diol (reactant B) by procedures well known in the art, such as with a tetrahydropyranyl ether, reacting the acyl halide with the remaining "exposed" hydroxyl group on (reactant B), then removing the "masking" influence such as by hydrolysis from the intermediate so prepared, and reacting the acyl halide with the resultant product to form the acetoxy compounds of the invention. The compounds of this invention can be recovered from the reaction mixture and purified by standard procedures.

Preparation of the compounds of this invention is illustrated by the following examples:

EXAMPLE I

Preparation of α,α'-bis(bromoacetoxy)-p-xylene

Approximately 82.9 grams (0.6 mols) of 1,4-benzene-dimethanol is suspended by fast stirring in 700 ml. of chloroform. Simultaneously, 242.3 grams (1.2 mols) of bromoacetyl bromide and 121.4 grams (1.2 mols) of triethylamine are added to the system. The reaction temperature is held between 10° and 15°C. The stirring is continued for about 1 hour and the system is allowed to come to room temperature.

The reaction mixtures are then washed several times with water, dried over MgSO₄ and stirred with activated charcoal for about 1 hour. After removing the charcoal by filtration, the chloroform is evaporated, leaving 187.7 grams of liquid, $n_D^{30}$ 1.5491. N.M.R. spectra confirms structure.

EXAMPLE II

Preparation of α,α-bis(bromoacetoxy)-2-bromo-p-xylene

The procedure of Example I is repeated, using 130 grams of 2-bromo-1,4-benzenedimethanol instead of the 1,4-benzenedi-methanol.

EXAMPLE III

Preparation of α,α-bis(bromoacetoxy)-2-methyl-p-xylene

The procedure of Example I is repeated, utilizing 99 grams of 2-methyl-1,4-benzenedimethanol instead of the 1,4-benzenedimethanol.

EXAMPLE IV

Preparation of α,α-bis(bromoacetoxy)-2-chloro-p-xylene

The procedure of Example I is repeated, utilizing 103 grams of 2-chloro-1,4-benzenedimethanol instead of the 1,4-benzendiemthanol.

EXAMPLE V

Preparation of α,α-bis(bromoacetoxy)-4-chloro-m-xylene

The procedure of Example I is repeated, utilizing 103 grams of 4-chloro-1,3-benzenedimethanol instead of the 1,4-benzenedimethanol.

In order to demonstrate usefulness, the following tests were conducted using α,α'-bis(bromoaetoxy)-p-xylene as exemplary of the compounds of the invention.

In vitro agar test

This test measures the bactericidal and fungicidal properties of a compound when in contact with a growing bacterium or fungi in an artificial medium. The test is conducted by adding 20 ml. portions of a suitable warm sterile agar solution into 20 × 100 mm. petri dishes. Next, the test compound is added to the petri dishes at certain concentrations expressed as μg./ml. and mixed with the warm mobile agar solution. This treated agar mixture is then allowed to cool to room temperature and solidify. Cells of the particular bacteria or fungi are then streaked on the surface of the solidified agar, and are then incubated for such a length of time that untreated samples containing no toxicant show luxurious growth typical of the particular organism. This time varies from 24 hours to one week depending upon the particular organism. The fungi are incubated at 30°C. and the bacteria are incubated at 37°C. Nutrient agar is used as the medium in this test for the bacteria. Potato dextrose agar is the medium used in this test for the fungi with the exception of *Pullularia pullulans* and *Trichophyton mentagrophytes* where Emmons agar is used. The table below shows the results when α,α'-bis-(bromoacetoxy)-p-xylene is used as the toxicant in this test.

TABLE I

| Organism | Minimum Inhibitory Concentration μg./ml. |
|---|---|
| Bacteria: | |
| Enterobacter aerogenes | (10) |
| Bacillus ceres | 5 |
| Brevibacterium ammoniagenes | (50) |
| Staphylococcus aureas | (10) |
| Fungi: | |
| Aspergillus oryzae | (5) |
| Aspergillus Niger | 5 |
| Aspergillus fumigatus | (1) |
| Aspergillus flavus | (1) |
| Penicillium italicum | (1) |
| Penicillium sp. | (1) |
| Penicillium expansum | (1) |
| Rhizopus stolonifer | 50 |
| Pullularia pullulans | 10 |
| Trichophyton mentagrophytes | (10) |

( ) indicates partial control at this concentration.

As can be seen by the test results, the compositions of the invention may be used in killing bacteria and fungi. The compositions may be applied directly to the particular undesired biological organism or may be applied to a locus to be protected. In either event, it is of course necessary that the unwanted organism receive an effective dosage or amount, i.e., an amount sufficient to kill or retard growth. The compositions may be applied to or in textiles, leather, paint, soaps, paper, wood, plastic, oil, and any other substances susceptible of growth of undesirable biological organisms.

The compositions are normally employed with a suitable carrier and may be applied as a dust, spray, drench or aerosol. The compositions thus may be applied in combination with solvents, diluents, various surface active agents (for example detergents, soaps or other emulsifying or wetting agents, surface active clays) carrier media, adhesives, spreading agents, humectants and the like. They may also be combined with other biologically active compositions, including other fungicides and bactericides, insecticides, growth stimulators, acaricides, herbicides, molluscicides, algaecides, etc., as well as with fertilizers, soil modifiers, etc. The compositions of the invention may be used in combination with an inert carrier and a surface active or emulsifying agent, and may also be applied in combination with other biologically active materials, in conjunction with a carrier and a surface active or emulsifying agent. The solid and liquid formulations can be prepared by any of the conventional methods well-known by those skilled in the art. Since the amount of active agent required will vary according to the biological organism treated, precise limits on the amounts employed cannot be given. Determination of the optimum effective concentration for a specific application is readily conducted by routine procedures, as will be apparent to those skilled in the art. As indicated, the amount applied in a given case will be an effective amount, i.e., an amount sufficient to give the type of control desired.

Various changes and modifications may be made without departing from the spirit and the scope of the invention described herein, as will be apparent to those skilled in the art to which it pertains.

I claim:

1. A fungicidal or bactericidal composition comprising a fungicidally or bactericidally effective amount of a compound having the formula

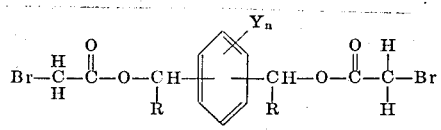

wherein R is selected from the group consisting of hydrogen and methyl; Y is selected from the group consisting of hydrogen, lower alkyl, chloro, and bromo, and $n$ is a whole number from 1 to 4, and an inert carrier.

2. The composition of claim 1 wherein Y is selected from the group consisting of hydrogen, methyl, ethyl, chloro, and bromo, and $n$ is a whole number from 1 to 3.

3. The composition of claim 2 wherein R is hydrogen and Y is hydrogen.

4. A method of killing fungi comprising applying to said fungi a fungicidally effective amount of a compound having the formula.

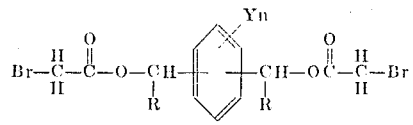

wherein R is selected from the group consisting of hydrogen and methyl; Y is selected from the group consisting of hydrogen, lower alkyl, chloro, and bromo, and $n$ is a whole number from 1 to 4.

5. The method of claim 4 wherein Y is selected from the group consisting of hydrogen, methyl, ethyl, chloro, and bromo, and $n$ is a whole number from 1 to 3.

6. The method of claim 5 wherein R is hydrogen and Y is hydrogen.

7. A method of killing bacteria comprising applying to said bacteria a bactericidally effective amount of a compound having the formula

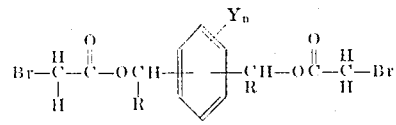

wherein R is selected from the group consisting of hydorgen and methyl; Y is selected from the group consisting of hydrogen, lower alkyl, chloro, and bromo, and $n$ is a whole number from 1 to 4.

8. The method of claim 7 wherein Y is selected from the group consisting of hydrogen, methyl, ethyl, chloro, and bromo, and $n$ is a whole number from 1 to 3.

9. The method of claim 8 wherein R is hydrogen and Y is hydrogen.

* * * * *